No. 689,067. Patented Dec. 17, 1901.
J. M. DEMERATH.
CANDY MACHINE.
(Application filed Nov. 13, 1897.)
(No Model.) 3 Sheets—Sheet 1.
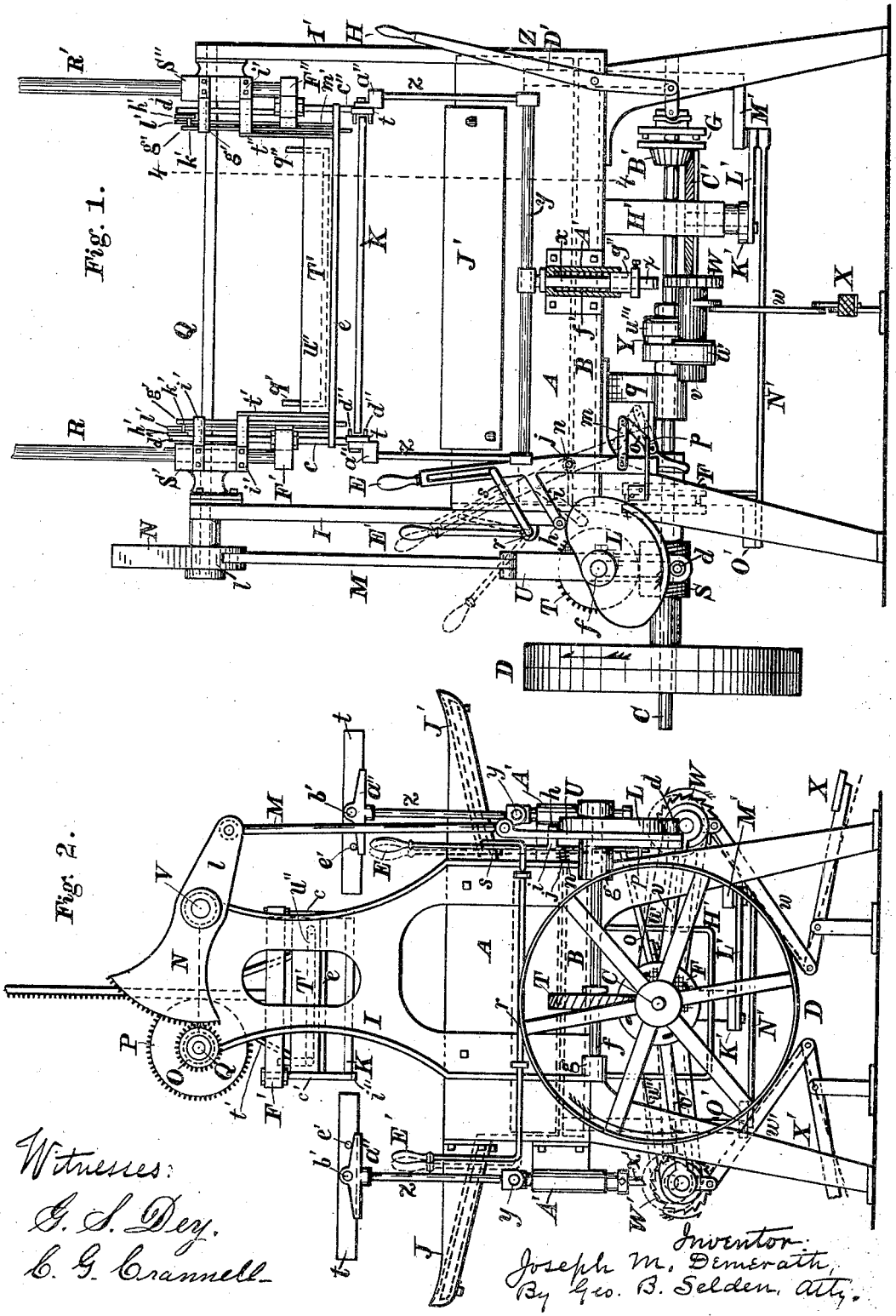
Witnesses:
G. S. Dey.
C. G. Crannell.
Inventor:
Joseph M. Demerath,
By Geo. B. Selden, Atty.

No. 689,067. Patented Dec. 17, 1901.
J. M. DEMERATH.
CANDY MACHINE.
(Application filed Nov. 13, 1897.)
(No Model.) 3 Sheets—Sheet 2.
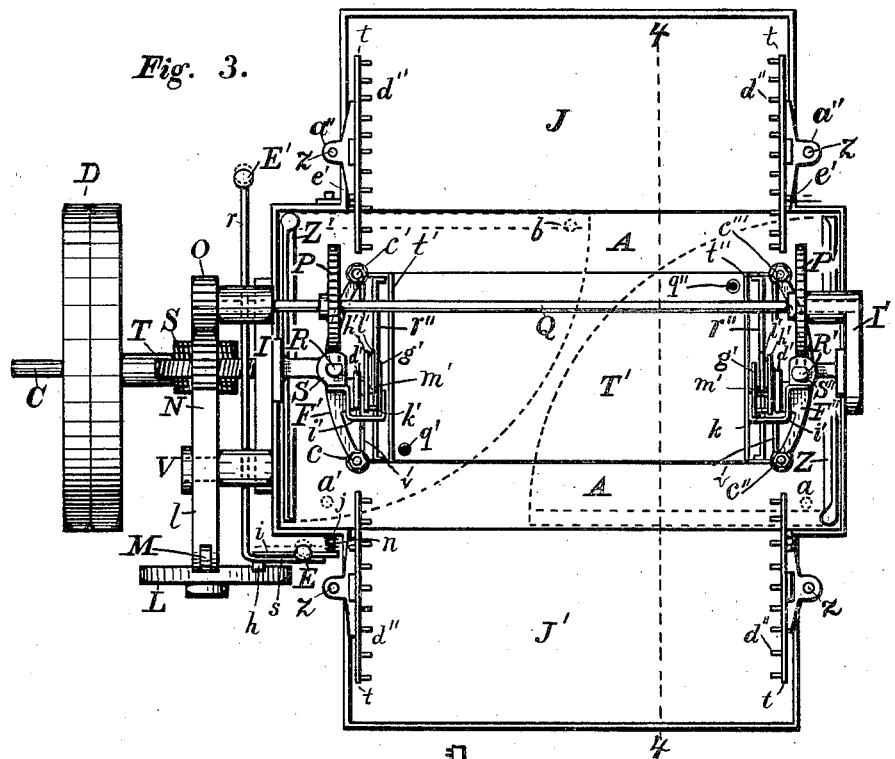
Fig. 3.
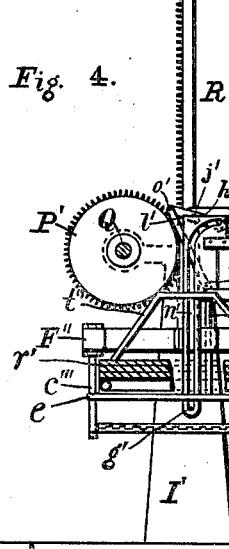
Fig. 4.
Fig. 7.
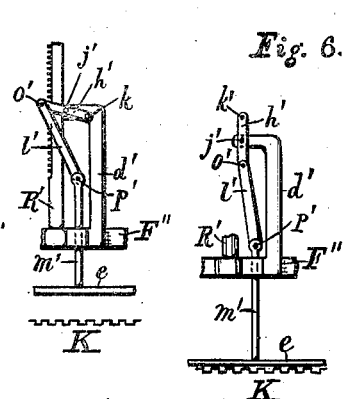
Fig. 5.
Fig. 6.
Witnesses:
G. S. Dey.
C. G. Crannell.
Inventor:
Joseph M. Demerath,
By Geo. B. Selden,
Atty.
THE NORRIS PETERS CO., PHOTO-LITHO., WASHINGTON, D. C.

No. 689,067. Patented Dec. 17, 1901.
J. M. DEMERATH.
CANDY MACHINE.
(Application filed Nov. 13, 1897.)
(No Model.) 3 Sheets—Sheet 3.
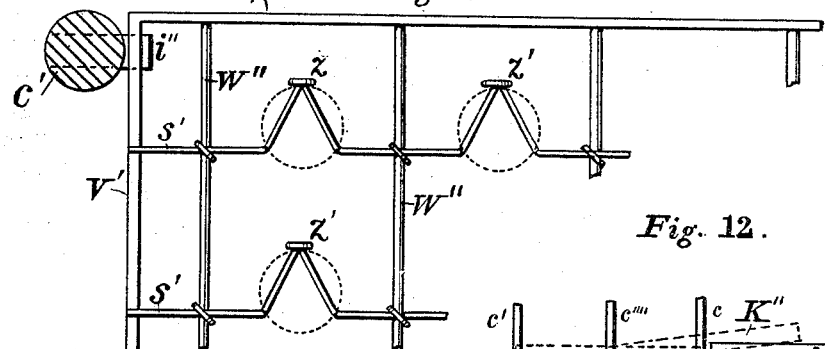
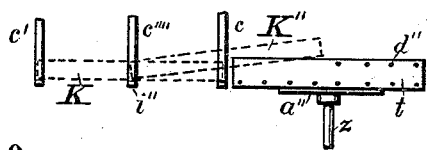
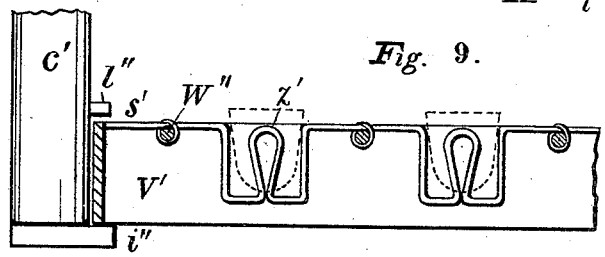
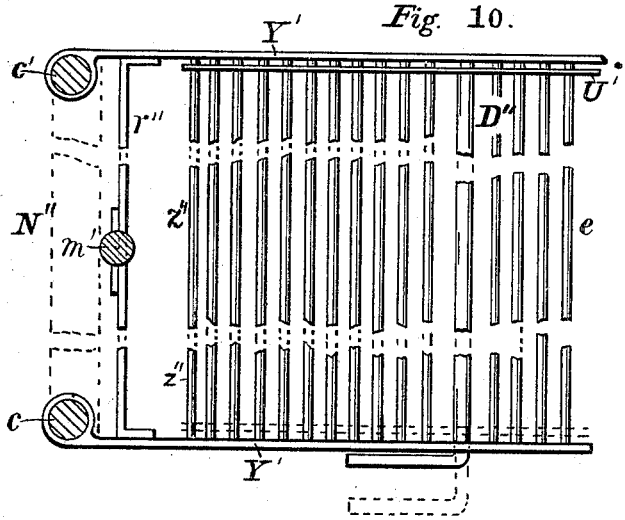
Witnesses:
G. S. Dey.
C. G. Crannell.
Inventor:
Joseph M. Demerath,
By Geo. B. Selden,
Atty.

UNITED STATES PATENT OFFICE.

JOSEPH M. DEMERATH, OF ROCHESTER, NEW YORK, ASSIGNOR TO WILLIAM H. WEEKS, OF PHILADELPHIA, PENNSYLVANIA.

CANDY-MACHINE.

SPECIFICATION forming part of Letters Patent No. 689,067, dated December 17, 1901.

Application filed November 13, 1897. Serial No. 658,368. (No model.)

*To all whom it may concern:*

Be it known that I, JOSEPH M. DEMERATH, a citizen of the United States, residing at Rochester, in the county of Monroe and State of New York, have invented certain Improvements in Candy-Machines, of which the following is a specification, reference being had to the accompanying drawings.

My invention relates to improvements in machines for coating candies with any suitable composition, said machine being designed more particularly for coating with chocolate, but being capable of use for other purposes.

My improvements are fully described and illustrated in the following specification and the accompanying drawings, the novel features thereof being specified in the claims annexed to the said specification.

In the accompanying drawings, representing a candy-coating machine embodying my improvements, Figure 1 is a front view. Fig. 2 is a side view as seen from the left hand of Fig. 1. Fig. 3 is a plan view. Fig. 4 is a partial vertical section on the line 4 4, Figs. 1 and 3, looking toward the right. Figs. 5 and 6 represent the mechanism for operating the cover. Fig. 7 represents the slotted plate detached. Figs. 8 and 9 are partial representations of one of the trays. Fig. 10 is a plan view of the cover and stripper. Fig. 11 is a section of one of the stirrers. Fig. 12 represents a modified manner of introducing the trays.

A represents the tank or receptacle for containing the chocolate or other coating material and in which the coating operation is performed. The receptacle is provided with a double bottom B, forming a steam-space into which steam is admitted for the purpose of maintaining the coating material at the proper temperature. The steam is admitted at two or more points, as at $a\,a'$, Fig. 3, through suitable openings in the lower side of the receptacle, to secure the equable distribution of the heat, the steam being discharged at a single opening, as at $b$. The receptacle is sustained at a proper height by suitable legs, and below it is placed the main driving-shaft C, which receives motion by the tight and loose pulleys D. When the machine is in operation, the shaft C revolves continuously, suitable clutches F and G being provided by which the operative parts of the machine are brought into action.

The machine is arranged so as to be fed from both sides, the inclined dripping-pans J J' extending outward from the receptacle on opposite sides, so that two operators standing in front of the dripping-pans J J' can alternately insert and remove the trays filled with the articles to be coated. The standards I I', arising from the opposite ends of the receptacle, support the operating mechanism by which the articles on the tray K are coated by being immersed in the material in the receptacle. When one of the operators has placed a filled tray in the machine, he engages the clutch F by one of the hand-levers E E', the cam L is started to revolve, and this, through the connection M, the segment N, and pinion O, imparts rotary motion to the shaft Q, which, through the gears and racks P P' R R', causes the tray K to descend into the receptacle and to rise out of it again, after which the tray is removed with the coated articles thereon. This operation is then repeated with another filled tray by the attendant on the opposite side of the machine. The cover $e$ first descends onto the tray and holds the articles thereon during the coating operation and is removed therefrom just before the completion of the upward movement of the tray. When the clutch F is engaged, it causes the worm S to revolve with the shaft C, and this imparts motion to the worm-gear T on the shaft $f$, which carries the cam L. As the cam L revolves the cover $e$ first descends on the tray K, and the cover and tray then descend together into the receptacle and are raised again therefrom, the cover $e$ again separating itself from the tray. The tray and cover descend from their own weight, being raised by the cam L as it revolves. After having completed a revolution, during which the tray has been depressed into the receptacle and raised up again, the clutch F is automatically disengaged, the roller $h$ on the arm $i$, attached to the lever E, coming in contact with the edge of the cam.

In Figs. 1 and 2 the parts are shown in the position they occupy when at rest, with the clutch F disengaged and the tray and supporting mechanism raised, the cover e being also elevated above the tray. The shaft f revolves in boxes g g, attached to the lower part of the standard I. A suitable journal-box may be used to support the outer end of the shaft C.

U is a slide which carries at its lower end the roller d, which bears against the edge of the cam L. The slide U is slotted to engage with the shaft f, and it may be also guided by a suitable arm attached to the journal-box g. At its upper end the slide U is jointed to the connection M, which is pivoted to the arm l of the segment N, which vibrates on the stud V, inserted in the standard I. The segmental gear N meshes with the pinion O on the shaft Q, which carries the gears P P', which mesh with the racks R R', so that as the slide U travels up and down in consequence of the rotation of the cam L the tray K also travels up and down.

In order to start the machine, the operator pushes the lever E inward toward the receptacle, as indicated by the full and dotted lines in Fig. 2, which movement frees the roller h from the cam L by shifting it inside the cam, thus leaving the cam at liberty to revolve, and he then engages the clutch F by shifting the lever E from right to left, as indicated in Fig. 1, which by the link m and lever o, engages the movable member of the clutch F with the other member, which is connected with the worm S. Any suitable clutch may be used—that represented consisting of two circular plates, one of which is provided with a series of holes in which pins on the other engage.

As the shaft C usually makes about seventy-five revolutions a minute, no time is lost in the engagement of the clutch. The starting-lever E is pivoted on a stud j, and a spring n, Fig. 2, is arranged on the stud between the lever and the receptacle, so that the lever can be shifted inward by sliding it on the stud to disengage the roller h from the edge of the cam L. During a portion of the revolution of the cam the roller h is held behind the cam; but as the cam revolves and its cut-away portion comes opposite the roller h the spring n forces the roller h outward over the edge of the cam, which by its continued rotation forces the roller h radially outward, and this shifts the lever E from left to right in Fig. 1 and so disengages the clutch.

p, Fig. 1, is a slotted plate which serves as a guide to the lower end of the starting-lever E. The link m is pivoted at one end to the lower part of the lever E and at the other end to the outer end of the lever o, which is provided at its inner end with a forked yoke which engages in a groove around the hub of the movable member of the clutch F. The lever o is pivoted to an arm attached to one of the journal-boxes q, Fig. 1, which depend from the receptacle for the purpose of supporting the driving-shaft C. The starting-lever is arranged so that the machine may be put in operation from either side. This may be done in any suitable way; but in the construction shown I arrange a rock-shaft r across one end of the machine and provide it at one end with the lever E' and at the other end with an arm s, the point of which engages in a slot in the lever E, as indicated in Fig. 1. By this arrangement the machine may be started from either side, the lever E' moving outward from the tank when the lever E moves inward to disengage the roller h from the cam L, and both levers swinging together when the clutch F is engaged or thrown out.

At their lower ends the racks R R' are provided with the cross-heads F' F'', from the outer ends of which depend four posts c c' c'' c''', which are provided with projecting pins or lugs which support the tray K at its corners, the arrangement being such that a tray may be readily inserted between the posts or removed therefrom from either side of the machine. The mechanism for causing the cover to descend on the tray will be understood from Figs. 4, 5, and 6. As soon as the shaft Q begins to revolve the racks R R', the cross-heads F' F'', and the tray K begin to descend. It is necessary to make the cover e close down on the candies on the tray before the latter reaches the coating material. To do this, I attach to the cross-heads F' F'' an arm d', which operates in connection with a slotted plate g' and a lever h' to accelerate the movement of the cover at the beginning of its descent, so that it will overtake the tray and travel farther downward with it. The lever h' is pivoted at j' to the upper end of the arm d', and its free end is connected by the link l' to the stem m', attached to the cover e. When the parts are at rest with the cover e above the tray, the pin k' on the lever h' rests in the upper end of the curved portion of the slot n' in the plate g'. When the cross-head F'' begins to descend, the pivot j' is moved downward, the lever h' swings about the pin k' as a pivot, its free end moves downward, the link l' straightens out, and the cover e is forced downward and makes contact with the tray or the articles thereon.

The operation will be readily understood from Figs. 5 and 6, in which the slotted plate g' (shown in Fig. 4) is omitted for the sake of clearness of representation. The rack R' slides in a guide S'', attached to the standard I'. The slotted plate g' is supported at a short distance inside the rack by the bent straps i', attached to the guide S'', the arm d', lever h', link l', and stem m' occupying the space between the slotted plate g' and the guide S''. The stem m' slides through and is guided by an opening in a boss on the cross-head F''. The lower end of the stem m' is attached to the end frame or one of the cross-bars of the cover e. The pin k' travels in the slot $n'$ in the plate $g'$. It will be understood that at the end of the upward or return movement the cover $e$ will be lifted off of the tray. It will also be understood that similar mechanism is used on the opposite end of the cover and tray for the purpose of securing the proper relative movements.

Immediately above the cover is placed the heater $T'$, which consists of a sheet-metal case of suitable dimensions, inclosing a coil of pipe $u''$, the ends of which $q'$ $q''$ project above the casing to receive the supply-pipes. The heater is supported in any suitable way, such as by the arms $t'$ $t''$ depending from the straps $i'$. The pipe $u''$ is bent on itself in any suitable way, so as to afford a sufficient supply of heat to the cover. In the construction shown it is soldered to the sheet metal forming the lower surface of the heater, and the arrangement is such that the cross-rods $z'$, Fig. 10, of the cover come into actual contact with the heater. By this arrangement the cover is maintained at such a temperature that it does not chill the coating material when in contact therewith. To prevent loss of heat, I fill the heater $T'$ above the coil $u''$ with one or more layers of asbestos $r'$, Fig. 4. It will, however, be understood that the principal function of the heater is to keep the cover warm, so that the coating material does not adhere to it and that this result may be accomplished in various different ways.

After the articles on the tray have been coated they should be allowed to drain over the inclined dripping-pans J J', which return the drippings to the tank. The draining is facilitated by jarring or shaking, and for this purpose the trays after coating are slid into the tray-supports $t$, arranged at the proper level on each side of the machine. The tray-supports are pivoted bars $t$, provided on their inner faces with ledges or rows of pins $d''$, Figs. 1 and 3, arranged at such a distance apart as to receive the tray between them. The bars $t$ are pivoted at $b'$ to a suitable head $a''$ on the upper ends of the supporting-rods $z$. The bars $t$ are provided with pins $e'$, which prevent more than a half-rotation as the tray after draining is turned over, so that a suitable board or other flat surface may be used to support the coated articles after their removal from the tray.

The mechanism for jarring the trays while on the tray-supports, so that the articles may be properly drained, consists, essentially, of the continuously-revolving serrated wheel W and devices for transmitting the vibration produced by such wheel to the tray-supports. The serrated wheel W is driven from the pulley Y, Fig. 1, on the shaft C by the belt $u'$, being supported by a movable frame $v$, which swings on the shaft C and is arranged to be raised upward to produce the jarring action by the treadle X and connection $w$. When the serrated wheel W is raised upward, it is brought in contact with the lower end of the sliding spindle $x$, Fig. 1, which at its upper end is attached to the horizontal bar $y$, from the ends of which the uprights $z$ reach upward alongside of the table or dripping-pan J' and at their upper ends carry the tray-supports $t$, one at each end of the tray. The spindle $x$ reciprocates in a suitable support A', attached to the side of the tank, and it is provided with the spiral spring $f'$, which increases the effect of the jarring movement. The spring $f'$ is coiled about the spindle $x$, and bears at its upper end against a shoulder in the interior of the support A' and at its lower end on a collar $q''$ on the spindle. The serrated wheel W is preferably hardened and also the lower end of the spindle $x$, which is beveled to correspond with the inclined or ratchet teeth of the wheel, which preferably gives some twenty or thirty vibrations for each revolution. The spring $f'$ increases the effectiveness of the vibration, increasing the rapidity of the descent of the tray. The movable frame $v$ is constructed in any convenient way so as to swing about the shaft C as an axis and to permit the wheel W to be elevated by the depression of the treadle X, which is pivoted to a bracket on the floor and connected to the frame by a link $w$, as shown. When a filled tray has been coated and shifted into the tray-supports and the coated articles on it are draining onto the inclined table or dripping-pan J', the operator depresses the treadle, raises the wheel W into contact with the lower end of the spindle $x$, and thus imparts to the tray a vigorous jarring movement, which materially hastens the drainage and quickly puts the coated goods into condition to be removed from the machine. The jarring mechanism is duplicated on the opposite side of the machine from that shown in Fig. 1. A serrated wheel W', Fig. 2, carried by a movable frame $v'$, driven from the pulley V by the belt $u'''$ and operated by the treadle X' and connection $w'$, is employed to impart a vibratory motion to the spindle $x'$, and thus through the rod $y$ and uprights $z$ to the tray-supports $t$.

Any suitable mechanism may be employed to keep the chocolate or other coating material properly stirred. For this purpose I arrange in the receptacle A the reciprocating stirrers Z Z', which are thrown into operation by the hand-lever H, operating the clutch G on the shaft C. (See Fig. 1.) At the opposite ends of the receptacle the stirrers Z Z' are arranged to swing inward across the lower part of the receptacle, being put in operation by the hand-lever H. When shifted to the right in Fig. 1, the hand-lever H, through a suitable connecting forked lever, engages the clutch G so as to revolve the bevel-pinion B', which through the bevel-gear C' imparts rotary motion to the crank K', which by connection L' reciprocates the crank M' on the lower end of a vertical shaft D', connected with the stirrer Z, which swings across the bottom of the receptacle above the steam-space to secure uniformity in the coating composition. At the other end of the tank is a corresponding stirrer Z', Fig. 3, the two being proportioned so as not to come in contact with each other. The crank K' works the crank M' on the lower end of the shaft D', connected with the stirrer Z through the connection L', and the crank M' through the connection N' and crank O' vibrates the stirrer Z'. The shafts of the stirrers reach downward through the bottom of the receptacle and through suitable journals, preferably cast with the legs, as indicated in Fig. 4. The stirrers preferably consist of two or more radial bars having inclined surfaces with an open space between them adapted to thoroughly mix the coating material, as indicated in the section, Fig. 11. The stirrers when folded, as indicated in Fig. 3, will not interfere with the descent of the tray.

Any suitable tray may be employed adapted to the shape of the articles to be coated. In Figs. 8 and 9 I have represented the tray K, which is adapted to candies of an ordinary shape and which consists of the frame V', the cross-wires W'', the transverse wires $s'$, which are bent downward laterally and again upward to form the contacts $z'$ and to inclose a candy of an ordinary shape, as shown. Any other suitable tray adapted to any other form of candy may be employed.

The cover for the tray is represented in Fig. 10. It consists of the side bars Y' with a series of parallel wires $z''$ extending between them. It may be provided with a stripper U', which consists of a plate perforated to slide on the wires $z''$ and provided with one or more rods D'', by which it is operated. The cover slides up and down on the posts $c$ $c'$ $c''$ $c'''$ and is provided with a cross-bar $r''$, to which the stem $m'$ is attached.

The tables or dripping-pans are made with a double bottom, as indicated in Fig. 4, and provided with openings for the connection of suitable pipes. The connections may be so arranged as to permit the use of steam or hot or cold water underneath the receptacle and the tables or dripping-pans.

The cross-heads F' F'' may be made shorter than as represented in the drawings, which will in a measure facilitate the introduction of the trays by bringing the posts $c$ $c'$ nearer together. The lower ends of the posts may also be connected together by a bar N', Fig. 10, which sustains the tray, instead of using the lugs $i''$. (Shown in Fig. 8.) A pin $l''$ may also be inserted in the posts to hold the tray down and to prevent its being raised by the cover's adhering to the coating material.

In a modification represented in Fig. 12 the pins $d''$ are omitted from the upper inner portions of the tray-supports $t$ to facilitate the introduction of the trays. In this case there are three posts $c$ $c'$ $c''''$, which depend from the cross-bars F' F'' at each end of the trays, each post being provided at its lower end with a supporting-lug $i''$, which engages under the tray. K'' represents the position of the tray while being inserted, its advancing edge being placed upon the lugs $i''$ at the lower ends of the central posts $c''''$, after which its outer part is permitted to rest on the inner portion of the lower row of pins $d''$, and it is then slid into proper position, as indicated at K.

I claim—

1. In a coating-machine, the combination, with the liquid-containing receptacle, provided with an inclined drip-pan leading thereto, of a dipping-tray support, means for lowering it into and raising it from said receptacle, a tray-support arranged over the said drip-pan, and means for jarring said latter support.

2. In a coating-machine, the combination with the receptacle for the coating composition, of a jarring-frame adjacent thereto, provided with pivoted supports for the tray.

3. The combination in a coating-machine, of a receptacle for holding the coating material, a dripping-pan projecting from one side thereof, the vertically-reciprocating tray, mechanism for immersing the tray in the coating material and removing it therefrom, a relatively movable cover adapted to retain the articles to be coated on the tray during the immersion, a suitable tray-support over the table, and means for jarring or vibrating the tray-support, substantially as described.

4. The combination in a coating-machine, of a receptacle for the coating material, an inclined dripping-pan attached thereto at one side, the tray, vibrating tray-support over the table, and means for vibrating the tray-support, substantially as described.

5. The combination in a coating-machine, of a receptacle, an inclined dripping-pan attached thereto, the tray, and a vibrating reversible tray-support located over the table, substantially as described.

6. The combination of the receptacle, the vertically-reciprocating tray adapted to be immersed therein, the relatively movable cover for articles on the tray, and mechanism for accelerating the motion of the cover, consisting of a plate having a curved slot, a lever pivoted to a part moving with the tray, and provided at one end with a pin engaging in the slot, and connected at the other end with the cover, substantially as described.

7. The combination with the coating-receptacle, of the vertically-reciprocating tray, the cover for the articles on the same, and the stationary heater at the upper end of the movement of the cover, substantially as described.

8. The combination with the tray K of the posts $c$, $c'$, $c''$, $c'''$, means for sustaining the tray on the posts, the cover $e$ arranged to slide on the posts, substantially as described.

9. The combination with the tray K, of the posts $c$, $c'$, $c''$, $c'''$, means for sustaining the tray on the posts, the cover $e$ arranged to slide on the posts, and the cover-heater T', substantially as described.

10. The combination with the receptacle of an inclined dripping-pan at one side thereof, the tray, a vibrating tray-support adapted to support a tray over the table, a shaft under the receptacle, the swinging frame on the shaft, a toothed wheel mounted on the swinging frame and driven from the shaft, a suitable connection whereby a jarring movement is imparted to the tray-support, and means for elevating the toothed wheel into contact with a part of the said connection, substantially as described.

11. The combination with the vertically-reciprocating tray and the relatively movable cover therefor, of mechanism at each end of the tray comprising the cross-head $F''$ having arm $d'$, the slotted plate $g'$, the lever $h'$ having a pin engaging in the slot, and suitable connections between the lever and the cover, substantially as described.

12. The combination with the receptacle A, of the shaft C located under the receptacle, the worm and worm-gear, the cam L, the connections between the cam and the vibrating segment, the shaft Q, gears $p$ $p'$ and racks R R′, the tray supported from the racks, and the relatively movable cover for the tray, substantially as described.

13. The combination with the receptacle A, of the vertically-reciprocating tray of a length less than the receptacle, the relatively movable cover for the tray, suitable mechanism for operating the tray and cover, and the horizontal swinging stirrers Z located in the opposite ends of the tank outside the tray, whereby the tray is permitted to descend between the stirrers when folded against the ends of the tank, substantially as described.

14. The combination with receptacle A, of the inclined dripping-pan J, the movable toothed wheel W, means for revolving the wheel, the support A′ attached to the tank, the reciprocating spindle $x$, the rod $y$, the upright $z$ at each end of the table, and the tray-supports $t$ on the upper ends of the uprights, substantially as described.

JOSEPH M. DEMERATH.

Witnesses:
GEO. B. SELDEN,
G. S. DEY.